United States Patent Office 3,129,331
Patented Apr. 14, 1964

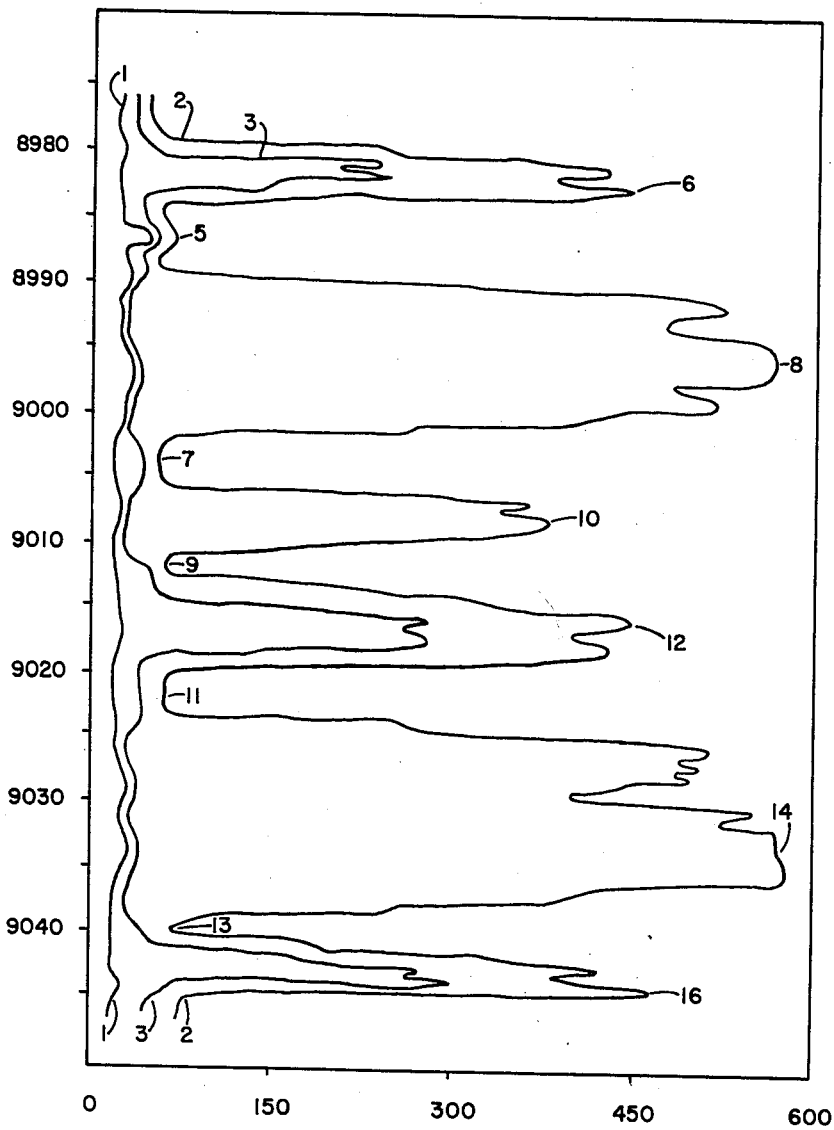

3,129,331
METHOD OF RADIOLOGICAL WELL LOGGING USING A RADIOACTIVE TRACER WITH A CARRIER
Henry A. Bourne, Jr., Earl W. Sutton, Francis R. Conley, and James C. Albright, all of Ponca City, Okla., assignors to Continental Oil Company, Ponca City, Okla., a corporation of Delaware
Filed Sept. 26, 1960, Ser. No. 58,485
12 Claims. (Cl. 250—83.3)

The present invention relates to a method of logging subterranean reservoirs traversed by well bores, particularly hydrocarbon-containing reservoirs. More specifically, this invention is directed to a method of logging the location and characteristics of the reservoir formations to indicate the locations of materials produced therefrom.

The inability to determine the stratigraphy accurately of a subterranean reservoir, together with an identification of the material obtained from each formation therein, is a well-established problem in the industry as evidenced by the amount of effort and writing devoted to the subject. This invention resolves the problem and provides the solution which previously has eluded individuals skilled in the art. Prior art discloses mechanical coring operations as an early method for determining the location and characteristics of the formations, but this approach was so inefficient and uneconomical that other methods were sought.

This promoted the development of electrical logging which is extensively used to produce logs reflecting reresistivity, porosity, lateral penetration, etc., based on correlation of measurements of an indirect nature. Electrical logging is subject to certain inherent factors, such as inability to compensate measurements for fissures, etc., which oftentimes results in inadequate or incorrect data incapable of being acceptable for use. Attempts to overcome these inherent defects have been made by utilizing an injection fluid sensitive to electrical conductance, an electrochemical approach whereby the reservoir characteristics are correlated to variations in logging measurements. This general approach has the above inherent disadvantages coupled with the inability to provide accurate data as to produced material, except that the electrochemical innovations are relatively accurate in locating water entry, providing adverse well fluid conditions are not present.

The most recent attempts have been the application of radiological methods, basically the introduction and tracing of radioactive materials in the well bore and formations. Determination of reservoir characteristics has been attempted by logging natural radiation of reservoir formations with a detector having an ionization chamber, a Gieger-Mueller counter, or a scintillation detector; by introducing a neutron source through the reservoir formations and detecting the diffusion of neutrons as a function of neutron disintegration in the presence of hydrogen with suitable apparatus; and by introducing a radioactive material through the well bore into the reservoir formations and withdrawing the excess radioactive material from the well bore whereafter a suitable detector is run through the well bore to determine the reservoir characteristics. The disadvantages of the foregoing methods are that the data are inaccurate, especially when the formation or fluid characteristics have large variances, and do not indicate any information as to relative quantities of the produced fluids.

An object of the present invention is to provide an improved method of radiological well logging which will yield accurate data for locating the points of entry of fluid production into a well bore traversing subterranean reservoir formations.

Another object of the present invention is to provide an improved method of radiological well logging which will yield accurate data as to reservoir formation characteristics, such as porosity, permeability, saturations, etc.

A further object of the present invention is to provide an improved method of radiological well logging which will yield accurate data as to the identity of fluid production from reservoir formations.

A still further object of the present invention is to provide an improved method of radiological well logging which avoids all of the disadvantages of the prior art teachings.

Briefly, the method of the present invention comprises logging the natural radioactivity of the producing formations adjacent the well bore with a suitable detector, introducing a radioactive material and a carrier in which it is soluble into a well bore traversing a subterranean reservoir containing hydrocarbons, dispersing said material and carrier under pressure into the reservoir formations, logging the formations adjacent the well bore with the detector, releasing the pressure and producing the well while intermittently repeating the logging step, and comparing the logs to determine the location and fluid produced from each reservoir formation together with pertinent formation characteristics.

The figure is a diagrammatic representation of a series of radiological well logs obtainable by logging a subterranean hydrocarbon-bearing reservoir producing both hydrocarbons and water in which the radioactive material has been used with an oil carrier in accordance with the present method.

The preparatory steps for utilizing the present invention do not comprise a portion of the invention but rather are conventional preparatory efforts to provide the necessary wellhead and bore equipment and fittings to receive an injection of extraneous fluids and to allow a detector device to be run in the well bore under conditions of pressure and production. This preparation would conventionally be the inclusion of a tubing inlet within the well bore and the installation of a survey flange with an offset at the wellhead to permit the running of a tool in the annulus of the well bore.

Thereafter a background log of the natural radioactivity of the producing formations adjacent the well bore is made by a suitable conventional detecting means, such as a gamma ray logging instrument.

Subsequent to preparing the well and transversing the producing reservoir with the necessary conventional apparatus above, the next step is the preparation of the radioactive material to be used as the tracer. This is accomplished by adding a suitable radioactive tracer material to a liquid carrier in which the radioactive material is substantially soluble. In logging a hydrocarbon-bearing reservoir, the radioactive material can be oil soluble, such as iodobenzene, triphenylstibine with radioactive antimony, cobalt naphthenate in benzene, or others, wherein the carrier can be any suitable liquid hydrocarbon, probably a volume of lease crude oil; or the radioactive material can be water soluble, such as potassium iodide, cobaltous chloride, antimony trichloride, or others, wherein the carrier is an aqueous media, such as any available surface water.

The radioactive material and carrier are combined and mixed in conventional equipment and introduced into the well bore, either cased or uncased, adjacent the reservoir formations. The radioactive material can be injected in sufficient volume to fill the complete well bore in order to make it possible to log the complete distance traversed by the well bore, but the more likely approach would be to introduce only a quantity sufficient to fill the well bore at those depths wherein formations are being produced to the well bore. The volume of radioactive material and tracer needed is readily determinable by known means, since the diameter of the well bore and the depths to be logged or quantities known or easily obtainable. Logging of the well bore should normally be limited to those portions adjacent producing formations for reasons of economics and safety, especially in the case of deeper well bores, in order that the amount of radioactive material can be kept to a minimum amount.

The preferable embodiment of this invention is to inject a volume of the radioactive material and carrier to fill the well bore adjacent formations communicable with the well bore and thereafter to inject a volume of material similar to the desirable production material, that is, oil in the case of an oil well or water in the case of a water well, to form a hydrostatic head within the well bore and to function as the hydraulic column for the transfer of pressure to the radioactive material. For purposes of explanation and clarity, it will be hereinafter assumed that the method of the present invention is being applied to a hydrocarbon-bearing reservoir, though it is within the scope of the present invention to include the application of the method to reservoirs containing other fluids, such as water.

The production from a hydrocarbon-bearing reservoir to which the present method of logging would have application is normally comprised of crude oil, including gases, and water; so it is desirable to locate the oil-producing formations and isolate the water-producing formations. In accordance with application of the present invention to a hydrocarbon-bearing reservoir, the suitable radioactive material is mixed with an oil or a water carrier and introduced into the well bore. Thereafter a sufficient volume of liquid hydrocarbon, such as lease crude oil, is introduced into the well bore to fill it substantially in order to provide the necessary hydrostatic head and hydraulic column. The fluid column within the well bore is then subjected to pressure by dumping or pumping additional crude into the well bore, which displaces the previously introduced radioactive material and carrier in a substantially uniform manner into all of the reservoir formations, except those having substantial impermeability. The pumping is continued until sufficient pressure is applied to disperse substantially all of the radioactive material into the reservoir at one formation or another, which is normally accomplished by injecting an additional volume equal to the volume of the radioactive material and carrier due to the relative incompressibility of the liquids introduced into the well bore.

Subsequent to the injection of the radioactive material and carrier, while the well bore is retained under the foregoing condition of pressure, the suitable conventional detector, such as a gamma ray logging instrument, is run through the well bore adjacent the producing formations of the reservoir. This provides a permeability profile log of the reservoir formations for subsequent use as comparison in order to equate the subsequent log or logs to determine the desired reservoir data. After obtaining this permeability profile log, the pressure on the well bore is released; and formation is returned to normal production by means of natural or mechanical forces. The radioactive material is produced from the formations by conventional production efforts, and the radioactive material is returned to the surface for retention in separate tankage until the radioactivity level of the material is sufficiently diminished to allow normal handling.

The reservoir formations can be subjected to a series of logs run at intermittent intervals of time by passing the detection means through the well bore concurrently with the normal production in order to obtain logs under actual conditions and not during conditions which are other than those of normal production. It is not necessary to run these intermediate logs, but rather the same results can be obtained by running a single log at the time that production of the wellhead reflects the absence of appreciable radioactive material, that is, providing that intermediate logs are not required to alter operations of production prior thereto.

The production of radioactive material occurs concurrently from all formations of the reservoir containing fluids which are normally produced from the reservoir. This method of logging is operated under actual production conditions and allows the maintenance of an accurate logging program under such conditions, not as in the conventional logging program wherein conditions are other than normal production. Production of reservoir fluids results in the displacement of amounts of the radioactive material and carrier from those formations producing fluids miscible with the carrier equal to normal formation recovery, but the radioactive material is displaced from those formations producing immiscible fluids to a lesser extent, and an appreciable amount of the radioactive material remains within the formations producing fluids immiscible with the carrier. As an example, a hydrocarbon carrier will be displaced from an oil producing formation in an amount equal to the normal production but from a water-bearing formation only to a lesser extent due to the immiscibility between the water and hydrocarbon being produced. The converse of this situation occurs when water is used as the carrier.

The following-detailed description taken in conjunction with the accompanying drawing will make the features and advantages more readily understandable and apparent. It is expressly understood that the drawing is solely for illustration and description and not intended as limiting of the invention. Referring to FIG. 1, the vertical scale represents depth in feet; and the horizontal scale represents gamma ray intensity. The initial log run obtained prior to the introduction of the radioactive material is a natural radioactivity log 1 as obtained by using a conventional logging instrument, such as a gamma ray tool, and provides a background for comparison with the subsequent logs.

The radioactive material dispersed into the reservoir for the logging program represented in the figure is mixed with a stock tank crude oil and substantially dispersed into the formation with other of said oil whereafter a permeability profile log 2 is made prior to returning the reservoir to production. Log 2 indicates that a number of the formations represented by 5, 7, 9, 11 and 13 are substantially impermeable formations, formation 5 exhibiting the highest degree of natural radioactivity within the reservoir, such as a shale formation. A number of the formations represented by 6, 8, 10, 12, 14, and 16 are the permeable formations within the reservoir as determined in accordance with log 2.

In the event that the only purpose of the logging program is to determine the identity of the various producing formations, the reservoir is produced normally until the fluid stream recovered at the wellhead indicates the lack of any radioactive material therein. Thereupon a log 3, referred to herein as the final log, is made upon the absence of radioactive material in the production, indicating that the oil carrier and radioactive material have been displaced from the hydrocarbon-bearing formations. From the foregoing, it is apparent that formations containing radioactive material are water producing, assuming an analyzation of the production reflects the normal situation of being essentially a combination of hydrocarbons and water. Log 3 indicates the lack of radioactivity in formations 8, 10, and 14, signifying miscible hydrocarbon-bearing formations; and formations 6, 12, and 16 contain radioactive material, indicating the production of the immiscible water. The permeability profile log 2 indicates the locations of permeable formations, the final log 3 indicates the location of formations wherein the radioactive material is not displaced by normal hydrocarbon production, and the natural radioactivity log 1 is necessary for comparison with log 3 to confirm the radioactive retention formations as water producing and not just naturally radioactive formations. It is therefore possible to locate the depth and production of the permeable formations of a reservoir by making a minimum of only three logs, though any number of logs can be made during the production of the radioactive material and carrier.

The converse of the foregoing paragraph applies completely to the same situation wherein the radioactive material is mixed with an aqueous carrier and dispersed into the reservoir formations.

From the foregoing, it will be apparent that the method of the present invention is susceptible to a variety of applications and embodiments, one of which is included below by way of example.

*Example*

The South Elk Basin reservoir was transversed by a well bore designated as unit No. 10 which was completed in the Tensleep formation in 1948. The well was producing from open hole in four separate zones within the Tensleep formation. The well is 7,112 feet deep and cased to a depth of 6,949 feet.

The well bore was equipped with a tubing inlet in order to inject the desired radioactive material into the formation, and the wellhead was provided with a survey flange having an offset opening to permit the running of a gamma ray tool in the tubing casing annulus. A tracer consisting of 240 millicuries of iodo-benzene was mixed with 40 barrels of lease crude and injected into the well bore, folowed by another volume of lease crude in order to provide a hydrostatic head to hold the formations and assist in squeezing the radioactive material and carrier into the formation. The pressure was pumped up, and substantially all of the radioactive material and crude carrier was dispersed into the formations whereafter an initial background log was run with a gamma ray logging instrument. A series of logging runs were made in successive time intervals of approximately 30 minutes for the first two hours; and thereafter the runs were made at intervals of approximately every four hours until substantially all of the radioactive material has been produced from the well bore and formations, except that the final logging run indicated that an amount of radioactive material was still retained in two formations previously determined by log comparisons to be water-producing formations.

The logging program completed in accordance with the present invention indicated the oil-producing zones within the formations to be from 6,962–6,966 feet, 6,971–6,975 feet, 6,996–7,018 feet, 7,040–7,064 feet, and 7,070–7,089 feet. The water productive zones within the formation were indicated at depths from 7,018–7,025 feet and 7,064–7,069 feet. It is obvious that the present invention discloses and teaches a method of determining the location of production from within a reservoir.

It is understood that the above description is given by way of illustration only and not of limitation and that deviations are possible within the spirit of the invention.

What is considered new and inventive is defined in the hereunto appended claims, it being understood that equivalents are to be construed as within the scope of the following claims.

We claim:

1. A method for locating and identifying fluid-producing formations of a subterranean reservoir traversed by a well bore with a radioactivity detection means which comprises passing said detection means through the well bore and recording the measurement of radioactivity of the naturally occurring radioactive material within the reservoir, introducing a radioactive material into said well bore, injecting a fluid to displace said radioactive material into the reservoir formations, passing said detection means through the well bore and recording the measurement of radioactivity, returning the reservoir to normal production, passing said detection means through the well bore upon the production fluids becoming substantially free of radioactive material and recording the measurement of radioactivity, and correlating said measurements with measurements of depth.

2. A method for locating and identifying fluid-producing formations of a subterranean reservoir traversed by a well bore with a radioactivity detection means which comprises passing said detection means through the well bore and recording the measurement of radioactivity of the naturally occurring radioactive material within the reservoir, introducing a solution of radioactive material and carrier into said well bore, injecting a fluid to displace said solution into the reservoir formations, passing said detection means through the well bore and recording the measurement of radio-activity, returning the reservoir to normal production, passing said detection means through the well bore upon the production fluids becoming substantially free of radioactive material and recording the measurement of radioactivity, and correlating said measurements with measurements of depth.

3. A method for locating and identifying fluid-producing formations of a subterranean reservoir traversed by a well bore with a radioactivity detection means which comprises passing said detection means through the well bore and recording the measurement of radioactivity of the naturally occurring radioactive material within the reservoir, introducing a solution of radioactive material and carrier into said well bore, injecting a fluid to displace said solution into the reservoir formations, passing said detection means through the well bore and recording the measurement of radioactivity, returning the reservoir to normal production, passing said detection means through the well bore a plurality of times upon the production fluids becoming substantially free of radioactive material and recording the measurements of radioactivity, and correlating said measurements with measurements of depth.

4. A method as set forth in claim 1 wherein said radioactive material is introduced into the well bore in an amount less than necessary to fill the well bore, and the remainder of the well bore is filled with a hydrocarbon liquid.

5. A method as set forth in claim 2 wherein the solution of radioactive material and carrier is comprised of an oil soluble radioactive material and a liquid hydrocarbon.

6. A method as set forth in claim 5 wherein the oil soluble radioactive material is iodobenzene and the liquid hydrocarbon is lease crude oil.

7. A method as set forth in claim 5 wherein the oil soluble radioactive material is triphenylstibine with radioactive antimony and the liquid hydrocarbon is lease crude oil.

8. A method as set forth in claim 5 wherein the oil soluble radioactive material is cobalt naphthenate in benzene and the liquid hydrocarbon is lease crude oil.

9. A method as set forth in claim 2 wherein the solution of radioactive material and carrier is comprised of a water soluble radioactive material and an aqueous medium.

10. A method as set forth in claim 9 wherein the water soluble radioactive material is potassium iodide and the aqueous medium is water.

11. A method as set forth in claim 9 wherein the water soluble radioactive material is cobaltous chloride and the aqueous medium is water.

12. A method as set forth in claim 9 wherein the water soluble radioactive material is antimony trichloride and the aqueous medium is water.

References Cited in the file of this patent

UNITED STATES PATENTS

| | | |
|---|---|---|
| 2,385,378 | Piety | Sept. 25, 1945 |
| 2,747,099 | Nowak | May 22, 1956 |
| 2,810,076 | Mardock | Oct. 15, 1957 |